Jan. 31, 1967   W. W. HENDRICKS   3,301,422
LOAD CARRIER FOR INDUSTRIAL TRUCKS
Filed March 24, 1964   4 Sheets-Sheet 1

INVENTOR.
WILLIAM W. HENDRICKS
BY Newton, Hopkins & Jones
ATTORNEYS

Jan. 31, 1967   W. W. HENDRICKS   3,301,422
LOAD CARRIER FOR INDUSTRIAL TRUCKS
Filed March 24, 1964   4 Sheets-Sheet 2

INVENTOR.
WILLIAM W. HENDRICKS
BY
Newton, Hopkins & Jones
ATTORNEYS

Jan. 31, 1967  W. W. HENDRICKS  3,301,422
LOAD CARRIER FOR INDUSTRIAL TRUCKS
Filed March 24, 1964  4 Sheets-Sheet 4

INVENTOR.
WILLIAM W. HENDRICKS
BY Newton, Hopkins & Jones
ATTORNEYS

3,301,422
LOAD CARRIER FOR INDUSTRIAL TRUCKS
William W. Hendricks, Atlanta, Ga., by court decree, assignor, by mesne assignments, to Space Control Corporation, Atlanta, Ga., a corporation of Georgia
Filed Mar. 24, 1964, Ser. No. 354,249
7 Claims. (Cl. 214—730)

This invention relates to material handling equipment and more particularly to a load carrier for an industrial truck, the load carrier being such as to permit a load of material to be picked up or discharged in front of, or to one side of the industrial truck.

Material handling equipment such as industrial trucks of the elevating fork-lift type customarily have a load carrier such as a fork lift formed by a vertical mast attached to the front of the industrial truck, the mast carrying a plurality of forks extending forwardly from the mast and being vertically movable. The plurality of forks are easily slid beneath, or from beneath, a load of material; and they are used to engage and disengage a load of material at any of a plurality of vertical positions, and to carry the load of material.

The difficulty with most previous load carriers used with industrial trucks is that they are not well suited for handling materials such as boxes and crates that are arranged in closely spaced rows. This is because a box or crate in a row with other boxes or crates can be engaged or disengaged by forwardly extending forks only by moving the industrial truck toward or away from the box or crate in a direction perpendicular to the row, and because substantial space between rows of boxes or crates is required to accommodate such motion of an industrial truck.

Numerous attempts have been made to provide a load carrier for an industrial truck which avoids this difficulty. These attempts have resulted in load carriers having forks which rotate toward one or both sides of the industrial truck. Such a load carrier permits the industrial truck to be positioned parallel to a row of boxes or crates with their forks extending toward a box or a crate. Thus, the industrial truck can be used between relatively closely spaced rows of boxes or crates.

The difficulty with the previous load carriers resulting from these attempts is: the center of gravity of a load carried by the forks of the load carrier is generally shifted as the forks are rotated toward a side of the industrial truck. This shifting of the center of gravity of the load causes instability of the industrial truck and results in excessive wear on the industrial truck, even in a tendency for the industrial truck to tilt or tip over.

In addition, these previous load carriers having rotatable forks generally support the forks, and a load on the forks, at a single point adjacent to the side of the industrial truck when the forks are rotated toward a side of the industrial truck. This causes instability of the industrial truck and places great stress at a single support point.

Moreover, previous load carriers having rotatable forks generally can position a load only to the side of the industrial truck when the forks are rotated. As a result, a box or crate cannot be moved toward or away from a row of boxes or crates without having a side of the industrial truck positioned substantially flush against the row of boxes or crates. This required positioning of an industrial truck makes the industrial truck difficult to maneuver and frequently causes the industrial truck to strike and damage a box or crate in a row of boxes or crates.

The load carrier for an industrial truck disclosed herein substantially eliminates these and other difficulties with previous load carriers used on industrial trucks. The load carrier has a plurality of forks which are rotatable between a front loading position in which they extend forwardly in the direction of motion of the industrial truck, and a transverse position in which they extend transversely to the direction of motion of the industrial truck. As the forks rotate between their front loading position and their transverse position, the center of gravity of a load carried by the forks remains in substantially that position which provides maximum stability to the industrial truck. Thus, the load carrier disclosed herein avoids the tendency of previous load carriers to shift the center of gravity of a load as the forks rotate.

In addition, the forks of the load carrier disclosed herein are slidable movable between their transverse position and a side loading position in which the forks are positioned to extend beyond a side of the industrial truck. In this side loading position, the forks of the load carrier disclosed herein engage or disengage a box or crate in a row of boxes or crates while a side of the industrial truck is parallel to the row of boxes or crates, but a substantial distance from the row of boxes or crates. Thus, the load carrier disclosed here is ideally suited for handling material such as boxes or crates arranged in closely spaced rows.

When the forks of the load carrier disclosed herein are in their side loading position so as to engage or disengage material such as a box or crate, the weight of the forks, and of the load being engaged or disengaged by the forks, is supported from a plurality of support points that are distributed across the width of the industrial truck rather than from a single support point adjacent to a side of the industrial truck. This not only increases the stability of the load carrier and of the industrial truck, but also avoids placing the entire weight of the forks, and of the load carried by the forks, at a single support point. These improvements in load carriers are provided by a load carrier having a fork positioning assembly supported and vertically movable in known manner by a mast of known type attached in known manner to the front end of an industrial truck. The fork positioning assembly comprises a positioning plate and means for imparting rotary and sliding motion to the positioning plate. The forks of the load carrier are fixedly attached to, and extend outwardly from the positioning plate; and, motion of the positioning plate causes the forks of the load carrier to move between their front loading position and their transverse position and to move between their transverse position and their side loading position.

The fork positioning assembly provides positive control over the motion of the forks at all times, and insures that the center of gravity of a load carried by the forks remains in a substantially fixed position relative to the industrial truck as the forks, and a load carried by the forks, are rotated. In addition, the fork positioning assembly positions the forks outwardly of a side of the industrial truck so that a load may be engaged or disengaged without interference from a side of the industrial truck. Moreover, it is the fork positioning assembly which serves to support the forks, and a load carried by the forks, from a plurality of points across the width of the industrial truck even when the forks are extended outwardly from a side of the industrial truck.

These and other features and advantages of the present invention will be more clearly understood from the following detailed description and the accompanying drawings in which like characters of reference are used throughout and in which.

Figure 1:
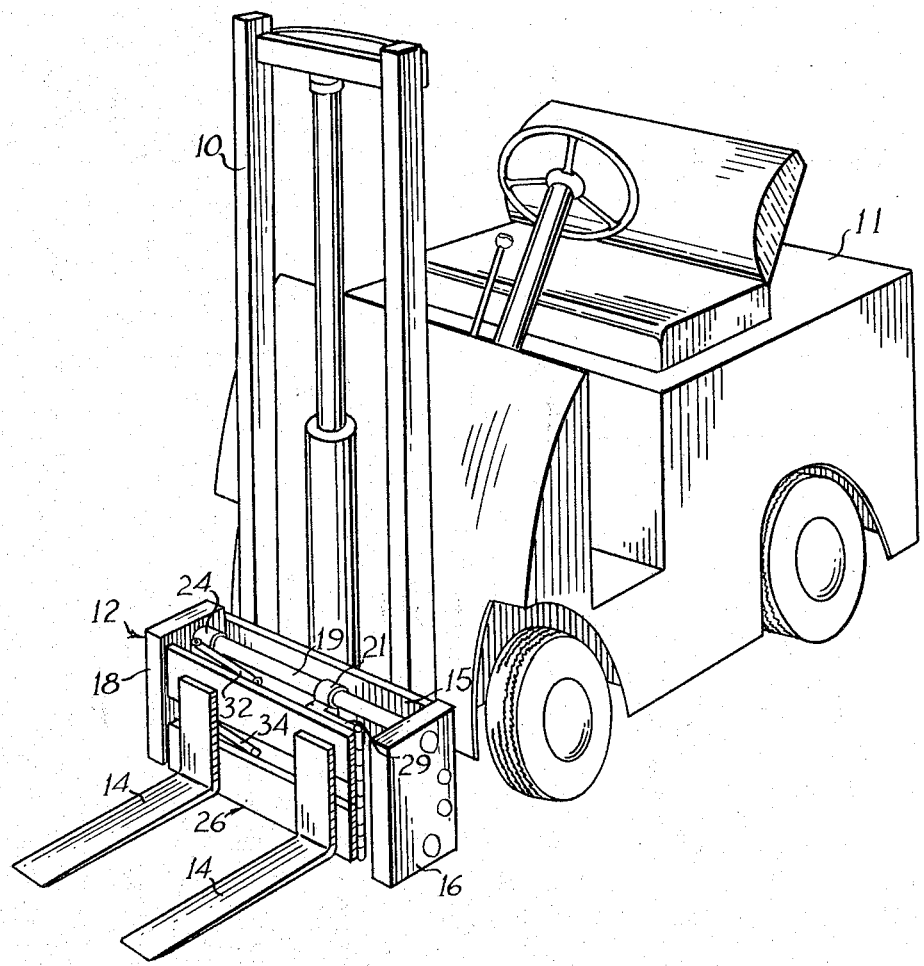
FIG. 1 is a perspective view of the load carrier disclosed herein mounted on an industrial truck, and showing the forks of the load carrier in their front loading position.

These figures and the following detailed description disclose a specific embodiment of the invention, but the invention is not limited to the details disclosed since it may be embodied in other equivalent forms.

The load carrier disclosed herein is best understood as comprising a mast 10 fixedly mounted on the front end of an industrial truck 11, a fork positioning assembly 12 carried by and vertically movable on the mast 10, and a plurality of forks 14 vertically movable with the fork positioning assembly and rotatably and slidably movable by the fork positioning assembly 12. The industrial truck 11 and mast 10 are of known type, and the mast 10 is fixedly attached to the front end of the industrial truck 11 in known manner.

The mast has a mounting plate 15 which is vertically movable in known manner; and the fork positioning assembly 12 is attached to the mounting plate 15 for vertical motion. It will now be understood that the industrial truck 11, the mast 10, and the manner in which the fork positioning assembly 12 and the forks 14 are vertically positioned are conventional and well known to those skilled in the art. Thus, the detailed description to follow is restricted to a description of the fork positioning assembly 12 and its operation. From this description, it will be seen that it is the fork positioning assembly 12 which provides rotational and slidable motion for the forks 14 regardless of their vertical position.

The mounting plate 15 is a rectangular plate that extends transversely across the front of the mast 10 and of the industrial truck 11. The fork positioning assembly 12 comprises a pair of mounting blocks attached to the mounting plate 15. A left mounting block 16 is on the left side of the mounting plate, and a right mounting block 18 is on the right side of the mounting plate 15. Between the mounting blocks 16 and 18, and transversely of the assembly 12, there extends a pair of parallel support rods including an upper support rod 19 and a lower support rod 20. The support rods 19 and 20 are in the same vertical plane, and are approximately horizontally disposed. The support rods 19 and 20 have rotating motion sleeves 21 and 22 respectively, which are slidable therealong, and transverse motion sleeves 24 and 25 respectively, which are slidable therealong. The sleeves are cylindrical with a concentric hole therethrough. A support plate 26 is carried by the sleeves 21, 22, 24 and 25 in such manner that the relative position of the support plate 26 is determined by the relative positions of the sleeves. Means are provided to move the sleeves along the length of the support rods 19 and 20.

Fixedly attached to both the upper rotating motion sleeve 21 and the lower rotating motion sleeve 22 is a hinge block 28 which extends forwardly from the rotating motion sleeves parallel to the direction of motion of the industrial truck. Attached to that side of the hinge block opposite the rotating motion sleeves are an upper hinge plate 29 and a lower hinge plate 30. The upper hinge plate 29 and the lower hinge plate 30 are rectangular plates which extend from the hinge block 28, parallel to each other and in a direction substantially transverse to the direction of motion of the industrial truck. The hinge block 28 and the hinge plates 29 and 30 are of sufficient lengths so that, when the rotating motion sleeves 21 and 22 are positioned against the left mounting block 16, the hinge plates 29 and 30 extend transversely to the direction of motion of the industrial truck lying in front of the left mounting block 16 and outwardly beyond the outer side of the left mounting block 16.

The support plate 26 includes an upper support member 26a which is pivotably attached to the extending end of the upper hinge plate 29, and a lower support member 26b which is pivotably attached to the extending end of the lower hinge plate 30. The forks 14 of the load carrier are L-shaped forks of known type. Each fork has a horizontal segment which is insertable beneath a load of material (not shown), and a vertical segment. The vertical segments of the forks are fixedly attached to the support plate 26. It will now be understood that the upper support member 26a and the lower support member 26b serve to form the support plate 26 from which the forks of the load carrier extend. It will also be understood that the support plate 26 supports the forks, and is in turn supported at one end by the extending ends of the hinge plates 29 and 30.

A link plate 31 extends between the upper transverse motion sleeve 24 and the lower transverse motion sleeve 25 to insure corresponding motion of the two sleeves. One end of an upper support arm 32 is pivotably attached to the upper transverse motion sleeve 24 in known manner; similarly, one end of a lower support arm 34 is pivotably attached to the lower transverse motion sleeve 25. That end of the upper support arm 32 that is remote from the upper transverse motion sleeve 24 is pivotably attached to a slidable plate 35 which is slidably positioned between two channel members 36 fixedly attached to the back of the upper support member 26a. The lower support arm 34 is similarly attached between the lower transverse motion sleeve 25 and the lower support member 26b. The result of this arrangement is that the upper support arm 32 is pivotably attached to the upper transverse motion sleeve 24, and is pivotably and slidably attached to the upper support member 26a; and, the lower support arm 34 is pivotably attached to the lower transverse motion sleeve 25 and is pivotably and slidably attached to the lower support member 26b. When the operation of the fork positioning assembly is understood, it will be seen that the arrangement results in the support plates being supported by both the hinge plates 29 and 30 and the support arms 32 and 34, and at points spaced apart on the length of the support plate 26.

*Operation*

The manner in which slidable motion of the rotating motion sleeves 21 and 22 and of the transverse motion sleeves 24 and 25 along the support rods 19 and 20 moves the support plate 26, the means for imparting slidable motion through the rotating motion sleeves 21 and 22 and the transverse motion sleeves 24 and 25 on the support rods 19 and 20, and other features of the invention disclosed herein are best understood in terms of the operation of the fork positioning assembly 12. The operation of the fork positioning assembly 12 is best understood by first considering the fork positioning assembly when the forks are in their front loading position.

When the forks are in their front loading position the horizontal segments of the forks 14 extend forwardly in a direction parallel to the direction of motion of the industrial truck, and the support plate 26 is in a transverse position in which it extends from the left mounting block 16 to the right mounting block 18 in a direction transverse to the direction of motion of the industrial truck 11. This transverse position of the support plate 26 is shown in FIG. 1 where it will be seen that, when the support plate 26 is in this transverse position, the support plate 26 is rotated toward the right mounting block 18. It will also be seen that the rotating motion sleeves 21 and 22 are positioned on the support rods 19 and 20 at that distance drom the left mounting block 16 necessary to plate the extending ends of the hinge plates 29 and 30, to which the support plate 26 is pivotably attached, just inwardly of the left mounting block 16, and that the transverse motion sleeves 24 and 25 are positioned on the support rods 19 and 20 against the right mounting block 18. With the transverse motion sleeves 24 and 25 in this position, and the support plate 26 transverse to the direction of motion of the industrial truck 11, support arms 32 and 34 extend from the transverse motion sleeves 24 and 25 inwardly to the sliding plates 35; and, it will be understood that the channels 36 which are fixedly attached to the back of the support plate 26 are sufficiently long for the sliding plates 35 to be near the middle of the support plate 26.

To rotate the forks 14 from their front loading position into the transverse position the rotating motion sleeves 21 and 22 are slid along the support rods 19 and 20 toward the right mounting block 18. In the specific embodiment of the invention disclosed herein, this motion of the rotating motion sleeves 21 and 22 is obtained by placing an upper piston rod 40 between the mounting blocks 16 and 18, and adjacent the upper support rod 19. An upper piston 41 is fixed to the rod 40, and an upper hydraulic cylinder 42 encloses the piston 41, the cylinder 42 being slidable on the piston rod 40 to dispose the piston 41 at either end of the cylinder 42. Hoses 43 are provided to carry the hydraulic fluid.

The hydraulic cylinder 42 carries a pair of pulleys 44 and 45 around which is an accelerating chain 46. The accelerating chain 46 is attached to the mounting block 16, extends to the more remote pulley 45, back to the pulley 44, thence to the mounting block 18 where it is attached.

An upper tab 48 extends from the upper rotating motion sleeve 21; and, the outer end of the tab 48 is fixed to the upper accelerating chain 46 at a point between the pulleys 44 and 45. It will now be seen that, when the upper hydraulic cylinder 42 is moved along its piston rod 40, the tab 48 will be moved and will, in turn, move the upper rotating motion sleeves 21. Since both rotating sleeves 21 and 22 are attached to the hinge block 28, both will be moved together. Due to the arrangement of the accelerating chain 46, the tab 48 will move twice as far as the upper cylinder 42. This distance is sufficiently far to move the rotating motion sleeves 21 and 22 to their opposite extreme position.

Figure 4:
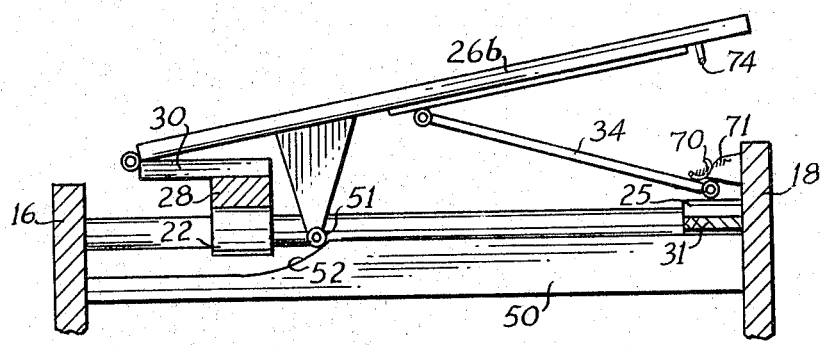
FIG. 4 is a cross-sectional view of the fork positioning assembly of the load carrier disclosed herein taken in a horizontal plane just above the cam plate, showing the cam as the forks of the load carrier start to rotate from their front loading position toward their transverse position.
Figure 5:
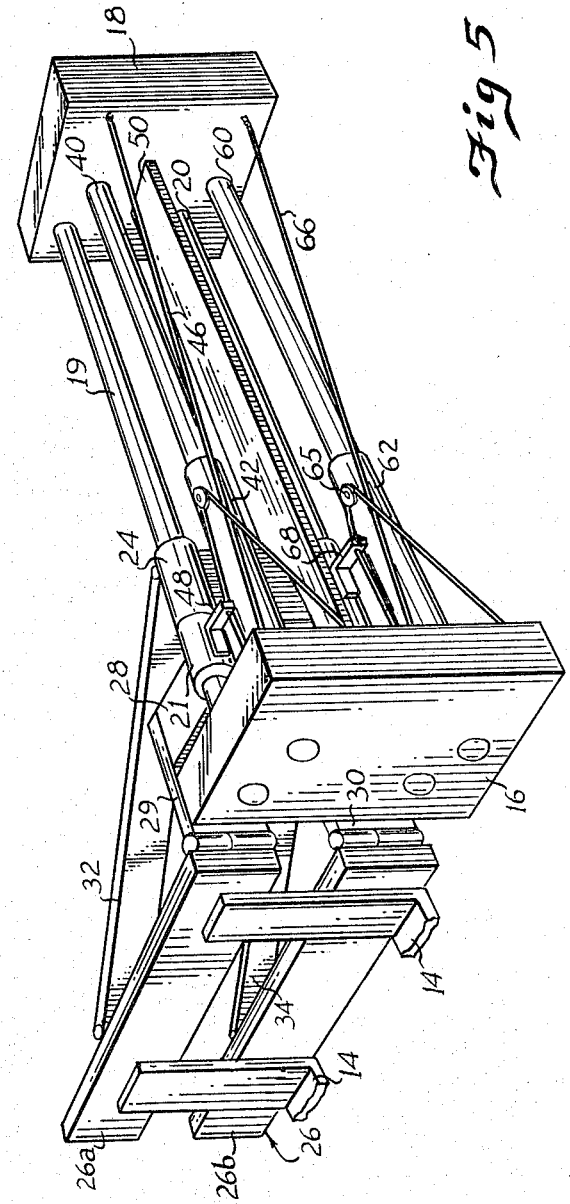
FIG. 5 is a perspective view of the fork positioning assembly of the load carrier disclosed herein, showing the support plate when the forks of the load carrier are in their side loading position.
Figure 6:
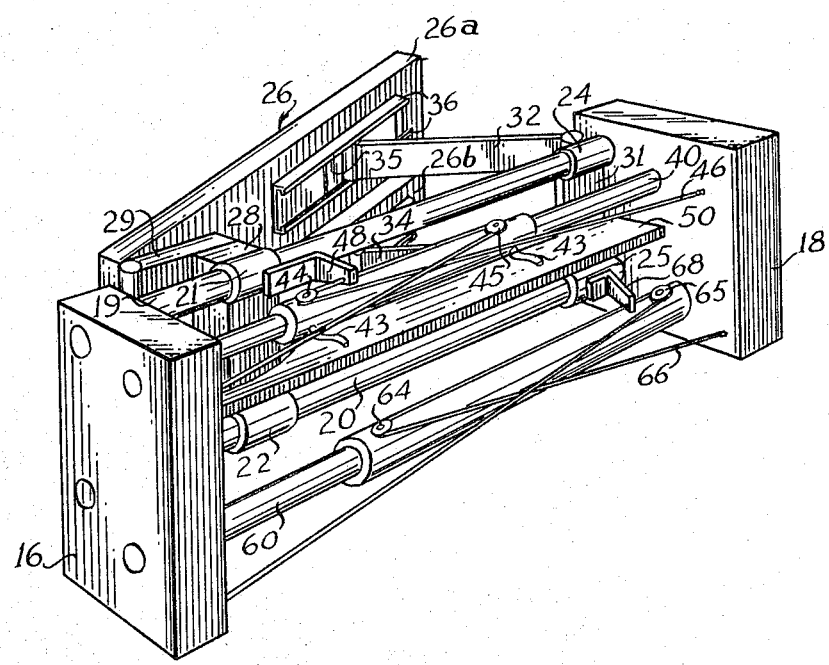
FIG. 6 is a perspective view of the fork positioning assembly of the load carrier disclosed herein, showing the support plate when the forks of the load carrier are partially rotated between their front loading position and their transverse position.

As is best seen in FIG. 6, motion of the rotating motion sleeves 21 and 22 toward the right mounting block 18, in response to motion of the upper cylinder 42 toward the right mounting block 18 causes the support arms 32 and 34 and the support plate 26 to pivot with respect to each other. This pivoting motion of the support arms with respect to the support plate permits the rotating motion sleeves 21 and 22 to continue to move toward the right mounting block 18 even though the transverse motion sleeves 24 and 25 are being forced against the right mounting block 18. This pivoting motion is insured by a cam plate 50 which extends from the left mounting block 16 to the right mounting block 18 between the upper support rod 19 and the lower support rod 20, the cam plate 50 serving to force the cam follower 51, which is mounted on the support plate 26, forwardly, away from the cam plate 50 as the rotating motion sleeves 21 and 22 start to move toward the right mounting block 18. This action of the cam plate 50 is best shown in FIG. 4 in which it will be seen that the cam plate 50 provides a camming surface 52 along which the cam follower 51 moves as the rotating motion sleeves 21 and 22 move toward the right mounting block 18, thus forcing the support plate 26 away from the hinge plates 29 and 30, and initially determining the manner in which the support arms 32 and 34, and the support plate 26, pivot with respect to each other.

Figure 2:
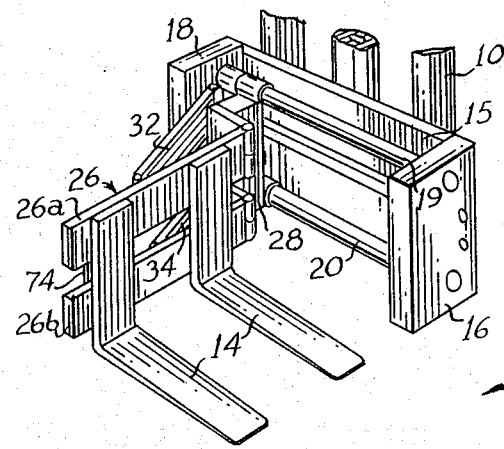
FIG. 2 is a perspective view of the load carrier disclosed herein, the forks of the load carrier being in their transverse position.
Figure 3:
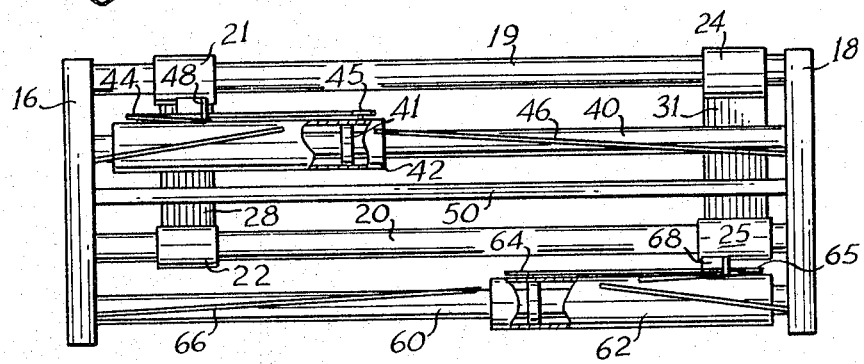
FIG. 3 is a rear elevational view of the fork positioning assembly of the load carrier disclosed herein and showing the positions of the sleeves and the positioning cylinders when the forks of the load carrier are in their front loading position.

Once the support arms 32 and 34 and the support plate 26 start to pivot with respect to each other, as determined by the cam plate 50, continued motion of the rotating motion sleeves 21 and 22 toward the right mounting block 18 results in pivoting of the support plate 26 with respect to the hinge plates 29 and 30 until the support plate 26 extends forwardly in a direction parallel to the direction of motion of the industrial truck, and in the pivoting and sliding of the support arms 32 and 34 until they extend from the transverse motion sleeves 24 and 25 to the support plate 26 as shown in FIG. 2. This occurs when the rotating motion sleeves 21 and 22 are moved to those positions along the support rods 19 and 20 that place them against a transverse motion sleeve 24 or 25; and, it will be understood that the motion of the support plate 26 places the forks 14 in a position transverse to the direction of motion of the industrial truck.

It will also be understood that the forks 14 are rotated about an axis of rotation that remains within an area forward of the support rods 19 and 20 and between extensions of the mounting blocks 16 and 18. The result is that the center of gravity of a load carried by the forks 14 is not shifted substantially toward either the right mounting block 18 or the left mounting block 16 as the forks 14 are rotated between their front loading position and their transverse position. Thus, the center of gravity of a load carried by the forks 14 remains in a substantially fixed position as the forks are rotated, and the rotating of the forks 14, and a load carried by the forks 14, does not result in instability of the industrial truck 11 on which the load carrier is mounted.

Once the support plate 26 has been rotated into its perpendicular position in which the forks 14 are in their transverse position, motion of the rotating motion sleeves 21 and 22 and the transverse motion sleeves 24 and 25 from adjacent the right mounting block 18 toward the left mounting block 16 causes motion of the support plate 26 and the forks 14 toward the left mounting block 16 transverse to the direction of motion of the industrial truck 11. In the specific embodiment of the invention disclosed herein, this motion of the rotating motion sleeves 21 and 22 and the transverse motion sleeves 24 and 25 is obtained by placing a lower piston rod 60 between the mounting blocks 16 and 18, and adjacent the lower support rod 20. A lower hydraulic cylinder 62 is carried by the piston rod 60, the arrangement being as described for the upper cylinder 42 and its rod 40. Similarly, the lower hydraulic cylinder 62 carries a pair of pulleys 64 and 65 around which pass a lower accelerating chain 66. The accelerating chain 66 is attached to both mounting blocks 16 and 18 in the same manner as the upper accelerating chain 46.

A lower tab 68 extends from the lower transverse motion sleeve 25; and, the outer end of the tab 68 is attached to the chain 66 at a point between the pulleys 64 and 65. As before, the tab 68, hence the lower transverse motion sleeve 25, will move twice as far as the cylinder 62; and, the upper and lower transverse motion sleeves 24 and 25 are joined by the plate 31 so that the two sleeves will move together.

As the transverse motion sleeves 24 and 25 move toward the left mounting block 16 in response to hydraulic pressure within the lower cylinder 62, the transverse motion sleeves 24 and 25 force the rotating motion sleeves 21 and 22 along the support rods 19 and 20 toward the left mounting block 16. As a result, the support plate 26 moves toward the left mounting block 16 while in its perpendicular position until motion of the transverse motion sleeves 24 and 25 along the support rods is stopped by the hinged block 28 and the rotating motion sleeves 21 and 22 striking the left mounting block 16. When this occurs, the support plate 26 is still in its perpendicular position, and the forks 14 are extending outwardly beyond the left mounting block 16 in their side loading position. It will be realized that motion of the rotating motion sleeves 21 and 22 toward the left mounting block 16, in response to motion of the transverse motion sleeves 24 and 25, can occur only if hydraulic pressure urging the rotating motion sleeves toward the right mounting block 18 is progressively released to permit motion of the rotating motion sleeves 21 and 22 toward the left mounting block 16. Any convenient arrangement of switches and valves in a known manner to permit this hydraulic response of the rotating motion sleeves and the transverse motion sleeves can be used.

It will be understood that, if the left mounting block 16 is at, or outwardly of, the side of the industrial truck, the side loading position of the forks 14 permits the forks 14 to engage or disengage a load of material even though there is a substantial space between the side of the industrial truck and the load of material being engaged or disengaged by the forks 14. Thus, the load carrier provided by the fork positioning assembly 12 disclosed herein is ideally suited for handling material arranged in closely spaced rows.

It will also be understood that whether the support plate 26 is in its transverse position or in its perpendicular position it is supported by the hinge plates 29 and 30 at one end and by the support arms 32 and 34 adjacent its opposite end, and that, whether the forks are in their front loading position or in their side loading position, a load carried by the forks is supported from two points. It will also be understood from what has been said above that a load may be partially rotated and partially moved transversely to the direction of motion of the industrial truck, and that the forks 14 are returned from their side loading position to their transverse position, and from their transverse position to their front loading position, by simply reversing the motion sleeves 24 and 25 described above.

A keeper arrangement is provided to prevent random pivotal motion when the support plate 26 is in a transverse position and the forks 14 are in their front loading position. This arrangement includes a C-shaped keeper 70 pivotally mounted on the right mounting block 18. A spring 71 is attached to one end of the keeper 70, and is attached to the block 18 in such manner that, as the keeper 70 pivots, the center line of the spring 71 will cross the pivot point to give a rotary force in the opposite direction. This is a toggle which will be understood by those skilled in the art.

A rod 74 is attached to the back of the support plate 26. The rod 74 is U-shaped, and is so located that the center, vertical portion will engage the keeper 70.

It will thus be seen that, as the rod 74 strikes one end of the keeper 70, the keeper will be pivoted causing the spring 71 to shift and exert a rotary force to hold the rod 74 in. The force that moves the support plate 26 out is sufficient to overcome the tension of the keeper spring 71 so that the fork positioning assembly 12 can operate as described above.

It will of course be understood that the device here presented is by way of illustration only, and is meant to be in no way restrictive; therefore, numerous changes and modifications may be made, and the full use of equivalents resorted to without departing from the spirit or scope of the invention as outlined in the appended claims.

What is claimed as my invention is:

1. In a load carrier for an industrial truck including a mast and a mounting plate carried by said mast and vertically movable thereon, the combination therewith of a pair of mounting blocks, one of said mounting blocks being attached to each end of said mounting plate; a pair of support rods extending between said mounting blocks, said support rods being substantially horizontal and parallel to each other; first motion means slidably mounted on said support rod, a supporting plate, said plate being adapted to assume a first position parallel to said rod and a second position perpendicular to said rod, load handling means mounted on said plate, first connecting means pivotably connecting said first motion means to a first region of said plate, second motion means mounted on said support rod laterally spaced from said first motion means, support arm means, means connecting one end of said support arm means to said second motion means, connecting means pivotably and slidably connecting said support arm means to a second region of said support plate, actuating means for rectilinearly moving said first motion means toward said second motion means, and cam means responsive to the rectilinear movement of said first motion means for guiding said plate through at least a portion of its pivotal movement to said second position.

2. The apparatus of claim 1 wherein the length of said second connecting means is greater than one-half the longitudinal dimension of said plate.

3. The apparatus of claim 1 wherein the dimensions of said first connecting means are such that said first connecting means are capable of extending beyond the lateral sides of said industrial truck when said plate member is in said second position.

4. The apparatus of claim 1 wherein said second region extends from a point at one side of the midpoint of said plate member across said midpoint to a point beyond, said second region being defined by an elongated channel member having oppositely disposed longitudinal U-shaped portions.

5. The apparatus of claim 1 wherein said second connecting means is attached to said second region at a point relatively near the midpoint of said plate when in its first position and is progressively displaced in a predetermined path along said second region toward the end of said plate opposite to said first region as said plate moves to said second position.

6. In a load carrier attached to an industrial truck having a longitudinal centerline together with a vertically movable mast, said mast having a transversely disposed portion relative to said longitudinal centerline and a pair of end portions extending outward and parallel to said longitudinal centerline, the combination therewith of rod means disposed between said end portions, a plate adapted with load handling means, said plate being adapted to assume a first position transverse to said longitudinal centerline and a second position normal to said first position, first motion means attached to said rod means, first connecting means pivotably connecting said first motion means to a first region of said plate, second motion means attached to said rod means laterally spaced from said first motion means, second connecting means pivotably and slidably connecting said second motion means to a second region of said plate laterally spaced from said first region, actuating means for rectilinearly moving said first motion means toward said second motion means, whereby said first connecting means translates the rectilinear motion into rotary motion for pivoting said plate from said first position to said second position, and cam means responsive to the rectilinear movement of said first motion means for guiding said plate through at least a portion of its pivotal movement to said second position.

7. The apparatus of claim 6 wherein said second connecting means is attached to said second region at a point relatively near the midpoint of said plate when in its first position and is progressively displaced in a predetermined path along said second region toward the end of said plate opposite to said first region as said plate moves to said second position.

References Cited by the Examiner

UNITED STATES PATENTS

| 2,874,862 | 2/1959 | Farmer et al. | 214—653 X |
| 2,945,610 | 7/1960 | Wendt | 214—730 |
| 2,950,831 | 8/1960 | Anzons | 214—731 |
| 3,166,209 | 1/1965 | Haddock | 214—736 |

FOREIGN PATENTS 1,038,163   9/1953   France.

GERALD M. FORLENZA, *Primary Examiner.*

HUGO O. SCHULZ, *Examiner.*

R. B. JOHNSON, *Assistant Examiner.*